Reissued May 9, 1939

Re. 21,077

UNITED STATES PATENT OFFICE 21,077

PECTATE AND METHOD OF MAKING SAME

Clarence Walter Wilson, Norco, Calif., assignor to California Fruit Growers Exchange, Los Angeles, Calif., a corporation of California No Drawing. Original No. 2,132,065, dated October 4, 1938, Serial No. 75,019, April 17, 1936. Application for reissue January 3, 1939, Serial No. 249,154

19 Claims. (Cl. 260—210)

This invention relates to a process for the production of pectic substances and a particular pectic substance which is characterized by the fact that an alcohol precipitate of its sodium salt, for example, is of a fibrous nature, these pectic substances being additionally characterized by the great viscosity of their aqueous sols.

In the manufacture of pectic substances, considerable effort has been directed toward developing methods and means whereby various pectic materials, i. e., pectin, pectates, and pectic acids could be isolated from the source materials. Such source materials include fruits and vegetables, as oranges, lemons, grapefruit, apples, grapes, quinces, sugar beets, carrots, etc., that contain appreciable amounts of pectic source material. This pectic source material in unripe fruits and vegetables is thought to be in the water-insoluble form called protopectin, in accordance with the nomenclature established by the American Chemical Society, as defined by the Committee on Pectin Nomenclature, and reported in volume 49, No. 5, of the Journal of the American Chemical Society for May, 1927, on page 37 of the Proceedings.

It has been known for many years that if one were to take a parent pectic source material, he could, by suitable treatment, convert the insoluble protopectin into the form of a soluble pectin. This may be done in any one of several ways: by acid hydrolysis; by hydrolysis with hot water; or by enzymatic action. By an alkaline hydrolysis, pectic acid may be produced.

As an example of a process for the production of pectic acid; one may refer to U. S. Patent No. 1,410,920, Huber, wherein is disclosed a method for the production of pectic acid as it is generally known. The material produced according to Huber, however, is of a non-fibrous nature, and is further characterized by the low viscosity of its aqueous sols.

So-called pectic acid has been produced by Ehrlich and Schubert, "Über die Chemie der Pektinstoffe", Ber., vol. 62, pp. 1974–2027 (1929), and Ehrlich and Kosmahly, "Chemie des Pektins der Obstfrüchte", Biochem. Zeit., vol. 212, pp. 162–239 (1929), but their material corresponds more nearly to pectin, as defined by the Committee on Pectin Nomenclature referred to above.

I have now discovered that it is possible to produce pectic substances which, so far as I am aware, have not been known heretofore. These products have a number of important uses; and, moreover, can be produced very economically.

Accordingly, it is an object of this invention to disclose methods and means for the production of a material in either crude or purified form, which is characterized by the fibrous appearance of the precipitated alkali salts, and which is further characterized by the high viscosity of the aqueous sols of its alkali salts.

A still further object of this invention is to provide and disclose methods and means of producing pectic materials which are especially suitable for the creaming or thickening of rubber latices.

Another object of this invention is to provide and disclose methods and means of producing pectated pulps in crude state, and fibrous alkaline pectates. Fibrous pectic acid can be produced from these pectates.

Another object of this invention is to provide and disclose methods and means for the production of pectated pectic materials suitable for use where highly viscous sols are required.

All of these and other objects and advantages will be apparent from a description of the products and processes embodied in the specification and will present themselves to those skilled in the art in the contemplation and use of this invention.

As a source material for the production of my fibrous pectates I propose to use citrus pulp, although other pectic source materials come within the scope of this invention. My products seem to be formed directly from the protopectin without going through the stage usually referred to as pectin.

An example of a method of producing my product follows:

Citrus pulp or peel which has been rather finely ground, as in a grinder having $\frac{3}{16}$ inch holes, is thoroughly washed with water as by suspending it in water, after which the water is allowed to drain from the pulp. The pulp is then preferably again suspended in sufficient water to give a fluid mass.

An alkali, such as soda ash, for example, is now added to the pulp with stirring, sufficient alkali being added to make the liquid just alkaline to phenolphthalein, that is, to reach about pH 8.5, enough alkali being added from time to time to insure the maintenance of this alkalinity. I have found that approximately 11.5 kilograms of soda ash will usually be sufficient to maintain the alkalinity in a tank containing 1500 liters of suspended orange pulp. However, for a more acid citrus fruit, i. e., lemons, a correspondingly larger quantity of alkali will be necessary to maintain the alkalinity, if the pulp has not previously been well washed.

The pulp is usually left in contact with the soda ash for a period of approximately 12 hours at a temperature not exceeding approximately 35° C., preferably about 25° C., after which most of the protopectin and pectin will have been converted into alkali pectate form.

Any free liquor is drained off and the pulp which has thus been pectated is thoroughly washed with water and then allowed to drain.

I may at first only make the batch just alkaline to litmus, i. e., about pH 7.0, for a short time, then drain off the liquid, re-suspend the pulp in water, and then add an alkali to bring the pH to about pH 8.5, for completing the pectating. The pulp is then drained and washed.

The pulp is now in a condition to be dewatered. This step may be carried out by means of a continuous expeller, or by a hydraulic press, or by centrifuging, or in any other suitable manner. After dewatering, the pulp may be ground and may then be dried, suitably in a rotary drier.

This pectated pulp, whether dried or not, may be dispersed in water when it is to be used. This may be done in accordance with the following typical formula:

| | Parts |
|---|---|
| Pectated pulp (dry basis) | 100 |
| Trisodium phosphate | 12 |
| Sodium hydroxide | 1.2 |
| Water (boiling) | 2000 |

The pectated pulp, trisodium phosphate, and sodium hydroxide, are added to the boiling water, with agitation. The suspension of pulp should be well agitated until the pulp is well disintegrated, say 15 minutes. the alkalinity of the dispersion should be tested at intervals with phenolphthalein and if it shows acid to this indicator, more alkali should be added in small amounts.

The dispersion prepared as above is ready for use as such or may be diluted to the desired consistency. It may be used for preparation of the purified fibrous pectates.

The purified fibrous pectates may be prepared as follows: The dispersion is preferably filtered through a suitable filter to remove the pulp particles. The pectate contained in the filtrate may now be precipitated by adding the filtrate to approximately an equal volume of alcohol.

The alcohol is removed from the precipitated pectate by suitable means and the pectate may then be dried at approximately 100° C.

The alkali pectates obtained by the above procedure are of a fibrous character or appearance, in contrast to the non-fibrous character of pectates made by other processes.

In general, alkali pectates, by which term I mean the alkali metal and ammonium compounds, may be prepared in accordance with the above disclosure. Where pectates other than sodium pectate are desired, it will be understood that suitable compounds of the other alkalies will be substituted for the sodium compounds indicated above. It is to be understood, furthermore, that other compounds of suitable alkalies may be substituted for the carbonate which, in the above description, is referred to as being added to the freshly ground pulp. Phosphates or hydroxides are examples of substitutes. The carbonates seem to give superior handling qualities to the pectated pulp.

If one desires, he may use the pectated pulp in its crude form without the filtration and alcohol precipitation which effect a separation of the alkali pectate from its cellulosic source material. For such use, the pectated pulp is simply dispersed in any suitable manner, such as described above.

The dispersion of the crude pectated pulp may be prepared in the manner described above and then precipitated with alcohol or other suitable precipitant, and dried. This precipitated material may be readily dispersed again by simply mixing it with cold water.

A relatively close control of the temperature and alkalinity at the time of hydrolysis of the source material is advisable. The combination of elevated temperature and strong alkali, such as disclosed in U. S. Patent No. 1,410,920, produces a pectate whose alcohol precipitate is non-fibrous, and whose sols are of a low viscosity.

A still further need for a relatively close control of the factors of temperature and alkalinity lies in the fact that pectic source material which has been pectated with a strong alkali, even though the temperature be within the optimum range for the production of fibrous pectates, is very slimy and difficult to dry, and ordinarily yields non-fibrous pectates.

To produce a pectated pulp that dries readily and produces good yields of fibrous pectates giving viscous sols, pectation should take place at a relatively low temperature and with a relatively weak alkali. I have found that the temperature should preferably not exceed 35° C., with a probable optimum of 25° C.

Other precipitants may be substituted for the alcohol referred to. It will be understood that by varying the conditions, variations in results may be obtained. Temperatures up to about 40° C., give pectates with increasingly viscous sols, but higher temperatures tend to give definitely lower yields.

Other soluble salts, as for example, oxalates and the like, may be used instead of the phosphate referred to above for dispersing the pectated pulp.

The new materials will preferably be handled as articles of commerce in the form of the crude, undispersed, pectated pulp, in the form of the dispersed and alcohol precipitated and hence readily re-dispersible crude pulp, or in the form of the purified fibrous pectate.

If either the unfiltered crude pulp dispersion or the filtrate therefrom be dried instead of being precipitated as by means of an alcohol, the dried material will be found to be relatively hard to disperse, apparently requiring the addition of further amounts of phosphate and hydroxide, or substitutes therefor.

As an illustration of the use of these products in creaming latex, I may make a solution of fibrous sodium pectate in water so that about 8 parts contain about 0.11 part of the pectate. Eight parts of this solution are stirred into about 100 parts of latex. This mixture is allowed to stand at 60° C. for a time sufficient to produce satisfactory creaming. This creaming goes on at a progressively decreasing rate. The time may be as long as 24 or even 48 hours, or longer. One latex subject to this particular treatment gave a cream which, at the end of 24 hours, contained about 60% rubber solids. The solids in a cream will, of course, depend upon the age and source of the latex and the treatment to which it has been subjected prior to creaming.

In addition to the uses for creaming of latex, or for the thickening of latex, these materials have a variety of other uses. For example, the highly viscous aqueous sols are very useful for quenching steel.

It is to be understood that any one of the forms of the materials, as above referred to, may be used for the production of viscous sols, as well as for other purposes.

I am aware that many modifications will occur to those skilled in the art, and it is not intended that the invention herein disclosed should be limited by specific details enumerated hereinabove, nor otherwise than as indicated in the appended claims.

I claim:

1. A crude pectated pulp of the nature described characterized by being capable of yielding pectates of the group consisting of pectates of the alkali metals and ammonium; the pectates yielded being fibrous in character and being obtained by dispersing the crude pulp in an aqueous medium, filtering the dispersion, and precipitating the fibrous pectate from the filtrate; the dispersion of the crude pulp being accomplished by boiling up about 100 parts (dry bases) of the crude pectated pulp with about 12 parts of a tribasic phosphate of the group consisting of the alkali metals and ammonium and about 1.2 parts of an hydroxide of the group consisting of the alkali hydroxides and ammonium hydroxide in about 2000 parts of water; the precipitation after filtration being accomplished by adding the filtrate to an approximately equal volume of alcohol.

2. A precipitated pectated pulp of the nature described characterized by its ready redispersibility in cold water and by being capable of yielding pectates of the group consisting of pectates of the alkali metals and ammonium; the pectates yielded being fibrous in character and being obtained by dispersing the precipitated pectated pulp in water, filtering the dispersion, and precipitating the fibrous pectate from the filtrate; the dispersion of the precipitated pectated pulp being accomplished by mixing it with cold water; the precipitation after filtration being accomplished by adding the filtrate to an approximately equal volume of alcohol.

3. Fibrous alkaline pectates.

4. The process which comprises subjecting pectic source material to hydrolysis with alkali at a pH not materially above 8.5 and at a temperature not materially above 35° C.

5. The process which comprises subjecting pectic source material to hydrolysis with alkali at a pH not materially above 8.5 and at a temperature not materially above 35° C., dewatering and drying the material.

6. The process which comprises subjecting pectic source material to hydrolysis with alkali at a pH not materially above 8.5 and at a temperature not materially above 35° C., dewatering the material, and dispersing it by heating it in water with an hydroxide from the group consisting of the alkali hydroxides and ammonium hydroxide and a soluble salt of a member of the group consisting of alkali metals and ammonium.

7. A process as claimed in claim 6 in which the material after dispersion is precipitated.

8. A process as claimed in claim 6 in which the material after dispersion is filtered and the filtrate is precipitated.

9. The process which comprises subjecting pectic source material to hydrolysis with alkali at a pH not materially above 8.5 and a temperature at which fibrous pectates can be obtained, dewatering and drying the material.

10. The process which comprises subjecting pectic source material to hydrolysis with alkali at a pH not materially above 8.5 and at a temperature not materially above 35° C., dewatering the material, and dispersing it by heating it in water with an hydroxide from the group consisting of the alkali hydroxides and ammonium hydroxide and a phosphate of a member of the group consisting of alkali metals and ammonium.

11. The process which comprises subjecting pectic source material to hydrolysis with sodium carbonate at a pH not materially above 8.5 and at a temperature not materially above 35° C., dewatering the material and dispersing it by heating it in water with an hydroxide from the group consisting of the alkali hydroxides and ammonium hydroxide and a soluble salt of a member of the group consisting of alkali metals and ammonium.

12. The process which comprises subjecting pectic source material to hydrolysis with sodium carbonate at a pH not materially above 8.5 and at a temperature not materially above 35° C.

13. The process which comprises subjecting pectic source material to hydrolysis with sodium carbonate at a pH not materially above 8.5 and at a temperature not materially above 35° C., dewatering and drying the material.

14. The process which comprises subjecting pectic source material to hydrolysis with sodium carbonate at a pH not materially above 8.5 and at a temperature not materially above 35° C., dewatering the material, and dispersing it by heating it in water with trisodium phosphate and sodium hydroxide.

15. A process as claimed in claim 11 in which the material after dispersion is precipitated.

16. A process as claimed in claim 11 in which the material after dispersion is filtered and the filtrate is precipitated.

17. The process which comprises subjecting pectic source material to hydrolysis with sodium carbonate at a pH not materially above 8.5, and at a temperature at which fibrous pectates can be obtained, dewatering and drying the material.

18. Fibrous sodium pectate.

19. Fibrous ammonium pectate.

CLARENCE WALTER WILSON.

CERTIFICATE OF CORRECTION.

Reissue No. 21,077. May 9, 1939.

CLARENCE WALTER WILSON.

It is hereby certified that error appears in the above numbered patent requiring correction as follows: In the heading to the printed specification, title of invention, for "PECTATE AND METHOD OF MAKING SAME" read PECTATES AND METHODS OF MAKING SAME; page 2, first column, line 37, for "the" first occurrence, read The; page 3, first column, line 23, claim 1, for "bases" read basis; and second column, line 11, claim 9, after "and" insert at; and that the said Letters Patent should be read with this correction therein that the same may conform to the record of the case in the Patent Office.

Signed and sealed this 27th day of June, A. D. 1939.

(Seal)

Henry Van Arsdale

Acting Commissioner of Patents.